United States Patent
Lunt (12) 
(10) Patent No.: US 6,181,726 B1
(45) Date of Patent: Jan. 30, 2001

(54) HIGH PERFORMANCE TELESCOPIC ETALON FILTERS

(76) Inventor: David L. Lunt, HC1 Box 398, Pearce, AZ (US) 85625

(*) Notice: Under 35 U.S.C. 154(b), the term of this patent shall be extended for 0 days.

(21) Appl. No.: 09/321,482

(22) Filed: May 27, 1999

(51) Int. Cl.[7] .................................................. H01S 3/08

(52) U.S. Cl. ................................. 372/98; 372/19

(58) Field of Search .................. 372/98, 19, 108

(56) References Cited

U.S. PATENT DOCUMENTS

| 5,028,879 | * | 2/1999 | Ershov | ................................. | 372/57 |
| 5,856,991 | * | 1/1999 | Ershov | ................................. | 372/19 |
| 5,889,590 | * | 3/1999 | Duggal et al. | ..................... | 356/352 |

* cited by examiner

Primary Examiner—Leon Scott, Jr.
(74) Attorney, Agent, or Firm—Lariviere, Grubman & Payne, LLP (57) ABSTRACT

A Fabry-Perot etalon filter for use as a telescope filter and method for making such etalons is disclosed. Particularly, an air-gap etalon having a first etalon plate and a second etalon plate being separated by a plurality of spacers. Said separation defining a gap. Said spacers being cut from a small area of a spacer substrate which has been formed to a high degree of uniformity. As a result, the spacers have a high degree of uniform flatness, parallelism, and thickness. By optically contacting the spacers to the etalon plates, the precision of the spacers is transferred to the etalon gap. For etalons where an obstructed central aperture is not critical, a centrally mounted spacer may be used to increase etalon gap uniformity across the entire surface of the etalon plates. Also, where a clear central aperture is needed, large peripherally mounted spacers may be used to establish high gap uniformity across the etalon. A method of constructing etalons is disclosed. Etalon plates formed using standard precision optical manufacturing and having appropriate thicknesses and appropriate coatings are provided. A spacer substrate formed using ordinary precision optical manufacturing processes is also provided. Spacers are then cut from the same local area of the spacer substrate and optically contacted to the etalon plates to form an assembled etalon. Additionally, the principles of the present invention may be applied to re-entrant etalons.

20 Claims, 7 Drawing Sheets

HIGH PERFORMANCE TELESCOPIC ETALON FILTERS

TECHNICAL FIELD

The present invention relates to the use and construction of high quality etalon filters. In particular, etalons used as telescopic filters.

BACKGROUND OF THE INVENTION

In telescopic astronomy it is frequently useful to observe objects using optical filters. Filters are particularly useful for observing objects at specific wavelength bandwidths. Additionally, filters are useful for reducing the overall level of light observed making them advantageous for observation of very bright objects such as the sun.

When attempting to observe objects at specific wavelengths, filters having highly precise bandwidths and passbands are required. Unfortunately, it has proven difficult to mass produce etalon filters having the requisite optical specifications. Furthermore, etalon filters typically suffer from thermally induced variations from the desired performance specifications.

One type of useful filter is the Fabry-Perot etalon filter. Although an excellent filter, it has not yet been possible to mass produce etalons having sufficient quality. Until now, the construction of such etalons has thus far been a highly sensitive "craft" able to manufacture only a few units at a time. As a result, etalons of this type are extremely expensive.

The characteristics of Fabry-Perot etalons are well known in the art and are discussed in a number of classic texts. For example, M. Born and E. Wolf, "Principles of Optics" Pergamon Press (1980) incorporated herein by reference. In general, a Fabry-Perot etalon consists of two parallel optically flat surfaces separated by a gap. The two surfaces may have an optical coating applied to their surfaces or may be uncoated. The surfaces can be the opposing faces of two separate plates separated by a gap, the gap being filled with air or a vacuum. Such an etalon is referred to as an "air-spaced etalon". An etalon may also be constructed using two parallel surfaces on opposite sides of a single solid plate. This is referred to as a "solid etalon". Both types are used extensively in spectral analysis, laser-line narrowing, mode selection, and as integral components in the construction of ultra-narrow band optical filters, as well as many other instances where spectral selection and filtering is desired.

An air-spaced etalon can be made extremely thermally stable, whereas a solid etalon is subject to changes in its optical thickness depending on changes in ambient temperature, thereby causing the passband of the etalon to change with changing temperature. Because it is desirable to have a stable passband, such solid etalons are not desirable.

Figures 1, 2:
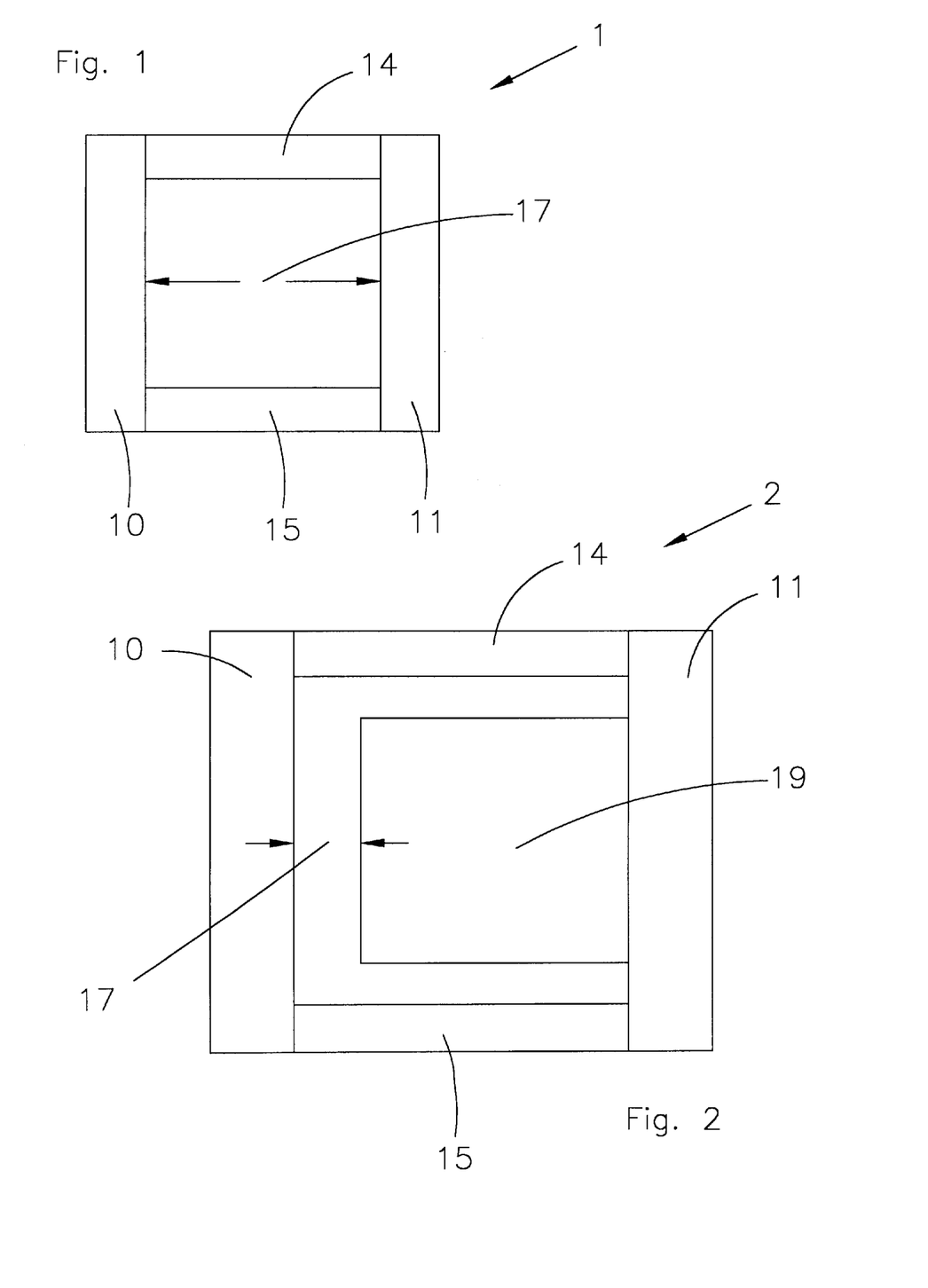
FIG. 1 is a cross-section view of an etalon constructed according to known principles.
FIG. 2 is a depiction of a re-entrant etalon constructed in accordance with known principles.

Historically, air-spaced etalons have been constructed using two different designs. FIG. 1 shows an etalon 1 having two parallel optically flat surfaces (also called plates or etalon plates) 10, 11 separated by spacers 14, 15, which define a gap 17 equal to the thickness of the spacers 14, 15. As the ambient temperature changes, the spacers 14, 15 expand and contract leading to an expansion and contraction of the gap 17 which changes the passband of the etalon 1.

FIG. 2 illustrates an alternative design known as a "re-entrant" etalon 2. Such etalons feature a third plate known as a "riser" 19. Typically, re-entrant etalons 2 are used when a gap 17 of less than about 0.5 millimeters (mm) is desired. The gap 17 in such structures is defined by the difference in length between the spacers 14 and 15 and the thickness of the riser 19. The optical quality of the etalon 2 and consequently its efficiency is governed by two factors, the flatness of the plates 10, 11 and the parallelism of the gap 17. In any etalon, the flatness of the plates is a limiting parameter. In the air-spaced etalon, the parallelism of the gap is controlled by the ability to form spacers demonstrating adequate parallelism and, in the case of the re-entrant design (FIG. 2), the ability to form an adequately parallel riser 19.

The chief difficulty in manufacturing telescopic etalon filters is that to meet the necessary optical tolerances, extremely precise, time consuming, and expensive manufacturing techniques must be used. Although it may be possible to hand-manufacture small numbers of air-spaced etalons of the type described above, such techniques are so specialized that only a few persons in the world can make such filters. These techniques are more in the nature of an art and not at all suited to mass production. In fact, there is no presently known method for constructing such devices in large quantities. What is needed is an etalon having a high degree of optical precision and a high degree of thermal stability as well as a method of mass producing such etalons.

SUMMARY OF THE INVENTION

Accordingly, the principles of the present invention contemplate an air-spaced etalon filter having a high degree of optical quality, a high degree of thermal stability, and a method for mass producing such etalons.

The etalon comprises an etalon plate having a first surface and a second etalon plate having a second surface. The first and second surfaces being separated by at least one spacer. Said separation defining a gap. The precision of the gap being enhanced by optically contacting the etalon plates to the spacers. Said spacers being formed to a high degree of uniformity such that thickness of the gap is highly uniform across the entire surface of the etalon plates.

The principles of the present invention may be used to construct etalon filters having excellent flatness and parallelism across the entire etalon surface. One such embodiment contemplates using a centrally located spacer. This embodiment may also incorporate peripherally mounted spacers placed around the etalon edges. Additionally, another embodiment improves plate flatness and parallelism without obstructing a central aperture by using peripherally mounted spacers of relatively large size. By optically contacting large spacers to etalon plates, the spacers contact large surface areas of the plates, thereby bending the plates into conformity with the spacers leading to excellent etalon plate flatness and parallelism.

Additionally, a third optical element having a third surface may be optically contacted to the surface of said second etalon plate. The separation between the third surface and the first surface defines a gap.

Also, in accordance with the principles of the present invention a method of mass producing the etalon filters of the present invention is disclosed. The etalon plates being formed using standard precision optical manufacturing techniques. The plates having appropriate thicknesses and having the appropriate coatings. A spacer substrate is then provided. The spacer substrate, having an appropriate thickness, is also formed using standard precision optical manufacturing techniques. Individual spacers are cut from the spacer substrate. Spacers cut from the same local area of the spacer substrate are optically contacted with the etalon plates to form an assembled etalon. The same principles may be used to construct re-entrant type etalons.

Other features of the present invention are disclosed or apparent in the section entitled "DETAILED DESCRIPTION OF THE INVENTION".

BRIEF DESCRIPTION OF THE DRAWINGS

For a fuller understanding of the present invention, reference is made to the accompanying drawings in the following Detailed Description of the Invention. Reference numbers and letters refer to the same or equivalent parts of the invention throughout the several figures of the drawings. In the drawings.

DETAILED DESCRIPTION OF THE INVENTION

Figure 3:
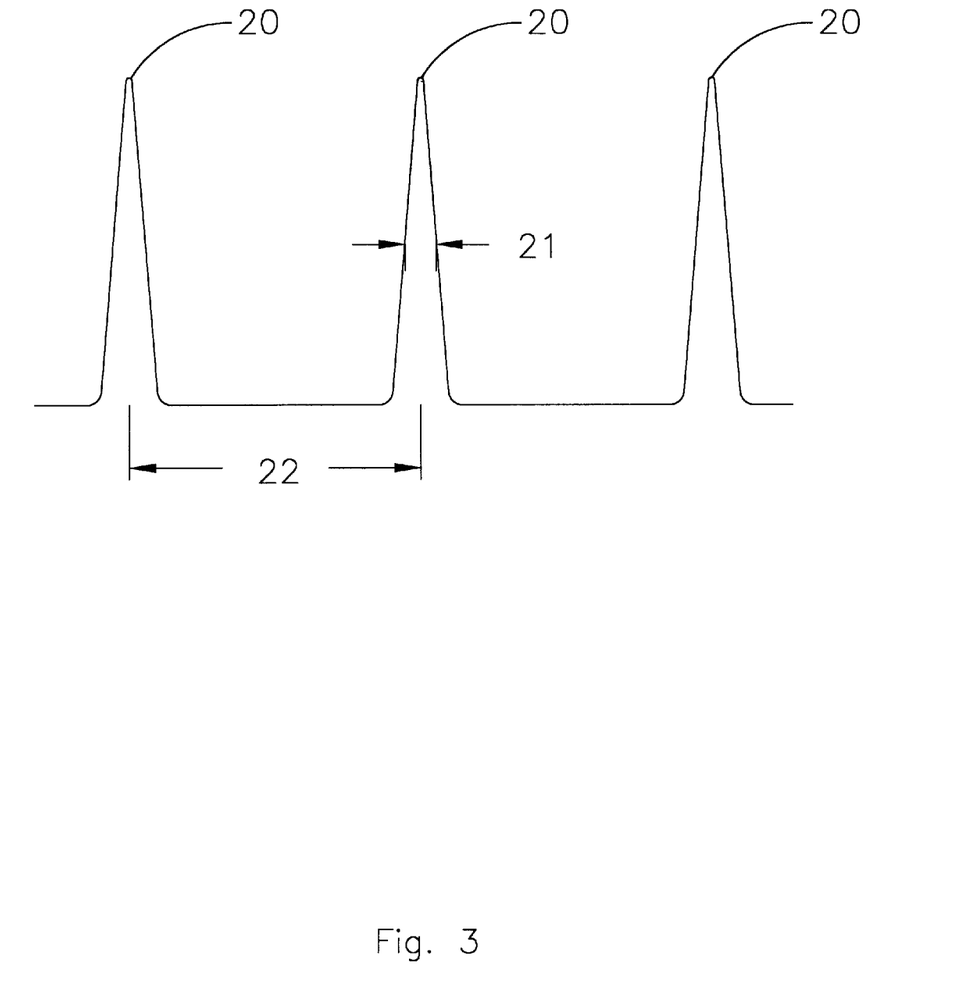
FIG. 3 is a graphical representation of light separated into a plurality of transmission peaks.

With reference to FIGS. 1, 2, and 3, light is passed through an etalon filter. Certain wavelengths of light are preferentially transmitted at transmission peaks 20. These transmission peaks 20 preferentially pass light at specific frequencies (or passbands) which are determined by the characteristics of the etalon. Each peak 20 has a bandwidth 21. The separation between the transmission peaks 20 is the Free Spectral Range (FSR) 22. (The FSR and bandwidth may be used to define another relevant parameter known as the finesse (F) of the signal. $F = {}^{FSR}/_{bandwidth}$ These terms and parameters may be used to describe etalon performance.

Current methods of manufacturing telescopic filters, using the basic designs shown in FIGS. 1 and 2, are not capable of being mass produced with the necessary optical quality to enable use in telescopic filter applications.

Figure 4:
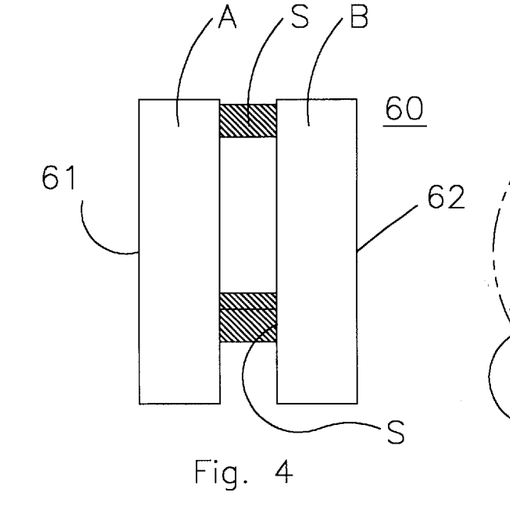
FIGS. 4 and 5 are side and plan views, respectively, of an etalon having three peripheral spacers constructed according to the principles of the present invention.
Figure 5:
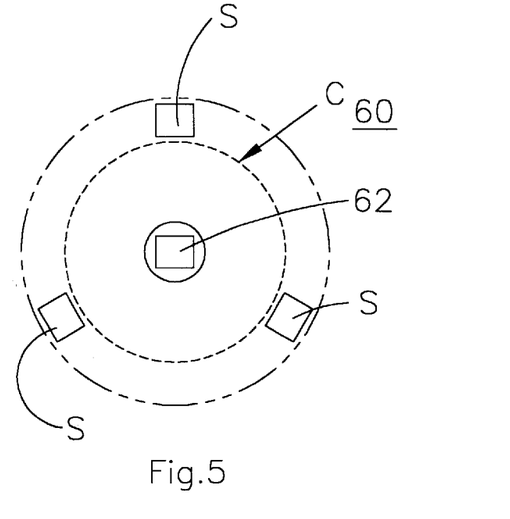

In accordance with the principles of the present invention, an embodiment of an etalon filter 60 that meets the above-mentioned performance requirements is shown in FIGS. 4 and 5. The etalon 60 features a first and a second optical element A and B (interchangeably referred to herein as plates or etalon plates) optically contacted to and separated by a plurality of spacers S (in this case three). A and B are typically formed of materials having a low coefficient of thermal expansion, for example, fused silica. Typical plate A, B sizes are about 15 cm in diameter, but can be constructed to any diameter. The thickness of the etalon plates A and B may be of any thickness, but a preferred thickness is about ⅙ of the plate diameter. For example, a plate A having a 15 cm diameter would have a preferred thickness of about 25 mm. The etalon plates A, B each have a central aperture C for transmitting light. Optionally, the outside surfaces 61 and 62 of the of plates A and B are coated in the area of the central aperture C, with a coating to enhance optical performance.

Figure 6:
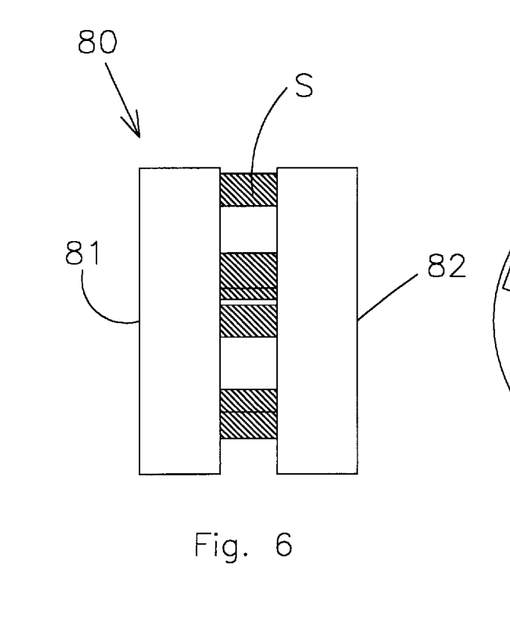
FIGS. 6 and 7 are side and plan views, respectively, of an etalon having a central spacer and peripheral spacers fabricated in accordance with the principles of the present invention.
Figure 7:
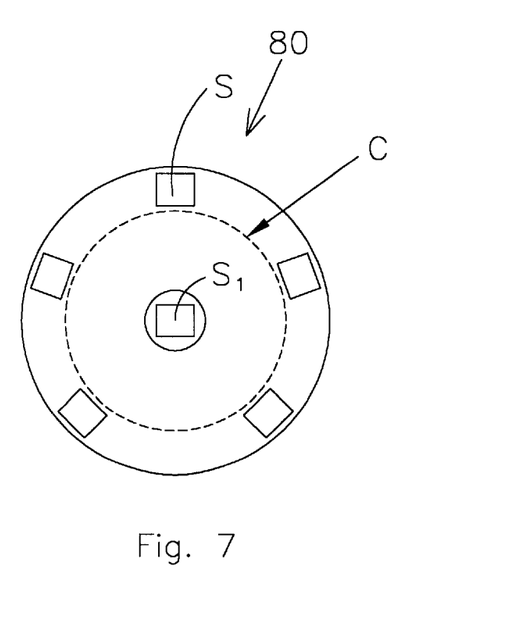

A particularly useful embodiment of the present invention takes advantage of the fact that in some filter applications it is not critical that light pass through the center of the etalon filter. For example, afocal filter applications or telescopes with the center of their objective lens already obscured. With reference to FIGS. 6 and 7, an etalon 80 is shown having a central aperture C. The etalon 80 features first and second etalon plates A and B optically contacted to and separated by a plurality of spacers S, $S_1$ (in this case six). As with etalon 60, the plates A and B and the spacers S, $S_1$ are typically formed of materials having a low coefficient of thermal expansion, for example, fused silica. Similarly, the etalon plates A and B may be formed having any thickness, but a preferred thickness is about ⅙ of the plate diameter. The etalon plates A, B each have a central aperture C. Also similarly, the surfaces 81 and 82 of plates A and B are coated in the area of the central aperture C, with a suitable coating. The advantageous feature of this embodiment is that a central spacer $S_1$ can be optically contacted to the center of the central aperture C. The area of the central aperture C where the spacer $S_1$ lies does not require an optical coating because there is no need for light to pass through the center of the aperture C. By centrally locating the spacer $S_1$, parallelism across the entire etalon 80 is surprisingly and substantially increased. This embodiment is useful in applications which do not require that light pass through the center of the etalon 80.

Figure 8:
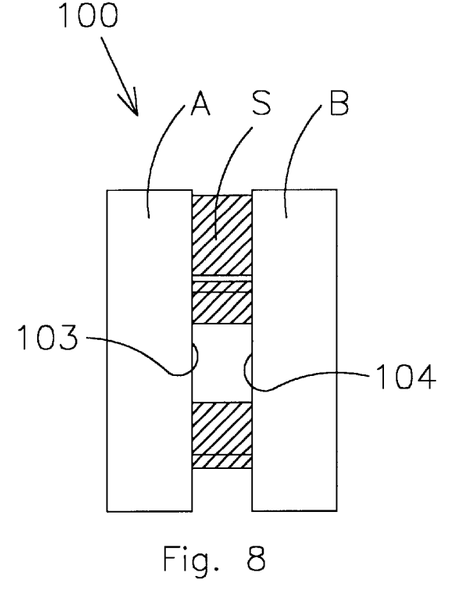
FIGS. 8 and 9 are side and plan views, respectively, of an etalon having a plurality of large peripheral spacers spaced about a small central aperture constructed according to the principles of the present invention.
Figure 9:
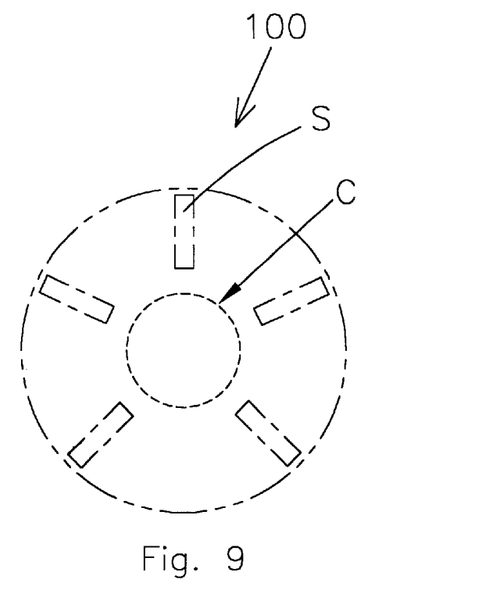

In another embodiment, a high degree of plate parallelism and optical precision may be attained by increasing the etalon plate A,B surface area contacted by spacers S. By optically contacting a larger portion of the plate surface, the ends of the spacers bend the etalon plates into increased conformity with the shape of the spacers. Therefore, if the spacer has the appropriate thickness, a high degree of flatness, and a high degree of parallelism, the optical contact between the spacer and plate will insure that, even if they are of lower optical quality, plates A and B share this high degree of flatness and high degree of parallelism as well as maintain the appropriate spacing. Moreover, as a higher percentage of the plate surface is in optical contact with the spacers, the overall surface of the etalon plates has a higher degree of parallelism and flatness thereby increasing the optical quality of the etalon. Referring to FIGS. 8 and 9, an etalon 100 having no central spacer and featuring a small central aperture C with a plurality of spacers S located around the edges of the aperture C is shown. In this embodiment the central aperture C is sized such that the spacers S have a length of at least half the radius of the etalon plates A, B. The size of the spacers is such that they maintain the optical faces 103 and 104 of the plates A, B at a precise distance across the whole surface including the aperture C. Furthermore, the parallelism of the plates A and B is increased in proportion to the amount of surface area the spacers S cover. In a preferred embodiment, the spacers S optically contact about 50% of the etalon plate surface. This design is useful for small aperture etalons or where there is a requirement for a non-obstructed aperture.

Figure 10:
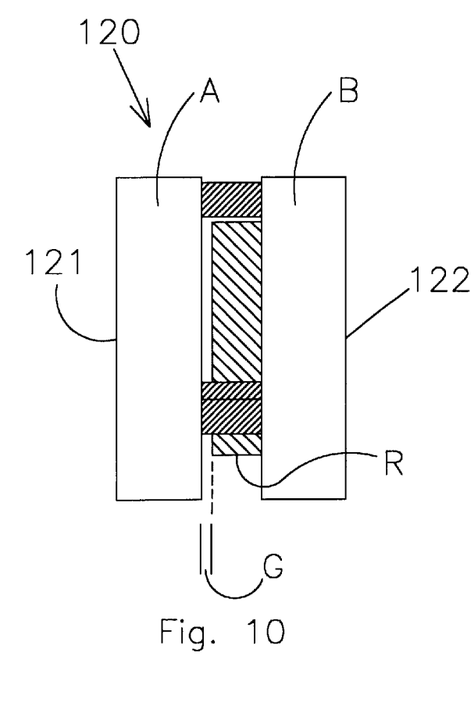
FIGS. 10 and 11 are side and plan views, respectively, of an etalon having three peripheral spacers and a central riser constructed according to the principles of the present invention.
Figure 11:
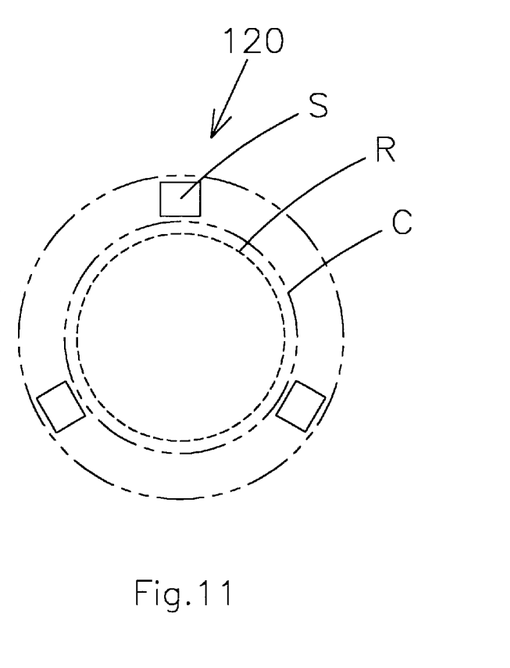

Other etalon filters can be constructed of the re-entrant type. FIGS. 10 and 11 show an etalon embodiment similar to that shown in FIGS. 4 and 5. The difference being that the etalon 120 shown in FIGS. 10 and 11 has a riser R. The etalon 120 has first and second etalon plates A and B separated by a plurality of spacers S. A, B and S are typically formed of materials having a low coefficient of thermal expansion, for example, fused silica. As in FIGS. 4 and 5, typical plate sizes are about 15 cm in diameter, but can be constructed to any diameter. The thickness of the etalon plates A and B may be of any thickness, but a preferred thickness is about ⅙ of the plate diameter. The surfaces 121 and 122 of plates A and B, respectively, are coated with a suitable optical coating. A third optical element, a riser R, is optically contacted to element B. The distance between plate A and riser R defines a gap G. Methods and dimensions used to construct risers are known in the art. The riser R typically being formed of the same material as plates A, B, i.e. fused silica.

Figure 12:
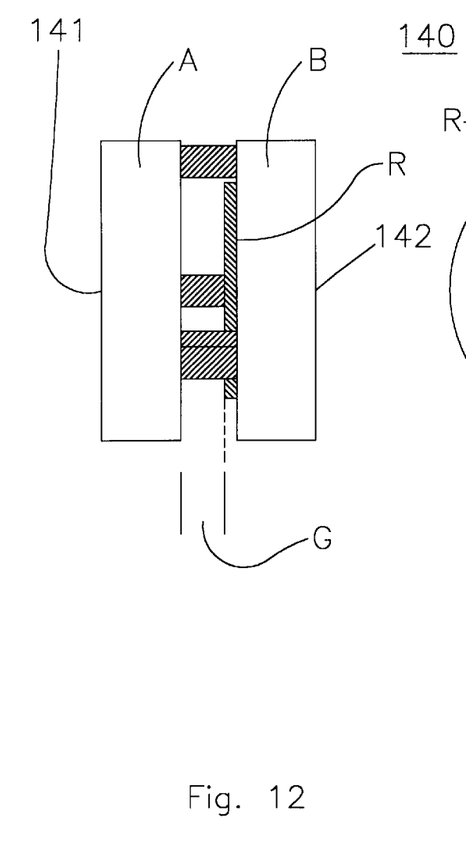
FIGS. 12 and 13 are side and plan views, respectively, of an etalon having a central riser and central spacer with peripheral spacers fabricated in accordance with the principles of the present invention.
Figure 13:
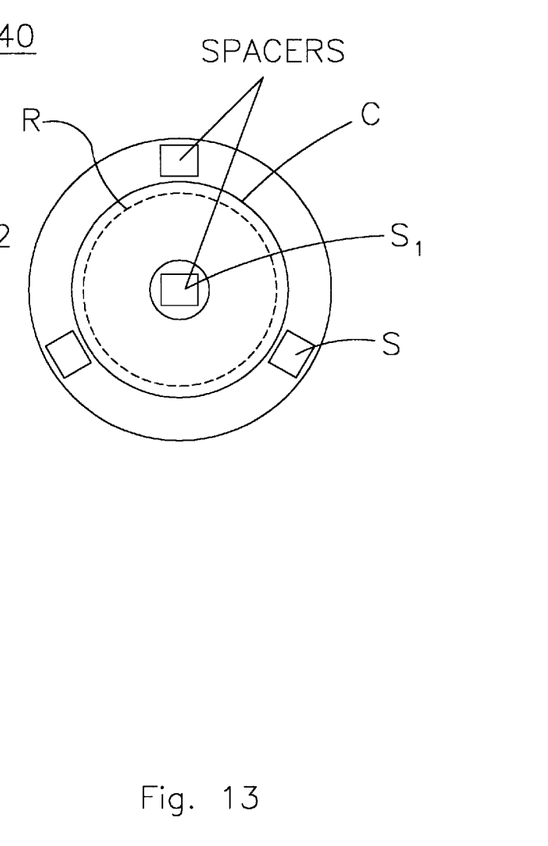

As with ordinary etalons (e.g. those shown in FIGS. 4–9), the spacers S of a re-entrant etalon may be placed in the center or around the periphery of the etalon. FIGS. 12 and 13 show a re-entrant type etalon used in filter designs similar to that depicted in FIGS. 6 and 7. Referring to FIGS. 12 and 13, the re-entrant design can be used to construct etalon 140 embodiments having a central spacer $S_1$. The etalon 140 has a central aperture C in the first and second etalon plates A and B. The plates A and B are separated by a plurality of spacers S, $S_1$ (in this case six). Materials and thicknesses are typically the same as explained in the discussions of FIGS. 10 and 11. The outside surfaces 141 and 142 of plates A and B may be coated in the area of the central aperture C, with a suitable coating. A riser R is contacted to plate B to form a gap G between plate A and the riser R. The riser R has an opening in the center to allow a central spacer $S_1$ to pass through. The central spacer $S_1$ passes through the center of the central aperture C and the opening in the riser R optically contacting both plates A and B. This centrally located spacer $S_1$ enables greater parallelism to be obtained across the entire etalon 140. This embodiment is also useful in telescopes which do not pass light through the center of the object lens.

Fabrication Methods Used To Construct A Preferred Embodiment Of The Invention

In the construction of etalons, the optical quality of the etalon and, consequently, its efficiency, is governed by two factors: The flatness of the plates A, B and the parallelism of the gap G. In any etalon, the flatness of the plates is a limiting parameter. Strictly speaking, it is not required that the individual plates be intrinsically flat, but match to each other to a very high degree, typically less than one hundredth ($\lambda/100$) of the wavelength at which they are intended to work. In an air-spaced etalon, the parallelism of the gap G is controlled by the ability to fabricate pairs of plates A, B which are adequately parallel and, in the case of re-entrant designs, the ability to fabricate a riser R which is adequately parallel to the opposing plate A.

The chief problems involved in etalon construction are:
1. Manufacturing the etalon plates such that pairs of etalon plates have a sufficiently high optical tolerance (typically less than $\lambda/100$ of the wavelength at which they are intended to work).
2. Maintaining those tolerances after the etalon plates have been treated with optical coatings is difficult. Optical coatings induce stress in the etalon plates which bends the etalon plates to a degree which prevents the plates from attaining the optical tolerances required. Sometimes used are so-called "soft coatings", which induce a lower stress on the plates. However, these soft coatings are easily damaged by environmental and mechanical causes and many such coatings tend to degrade over time. Furthermore, even soft coatings bend the etalon plates more than what is acceptable to achieve the required optical tolerance.
3. The performance of the etalon is also controlled by the parallelism and thickness of the spacers and, in re-entrant designs, the parallelism of the riser. Overall, etalon performance depends on the combined effect of plate stress, plate flatness, spacer thickness, and parallelism of the plates or risers.

Existing methods of construction have great difficulty in meeting all the performance criteria.

The principles of the present invention contemplate a method of etalon construction which is illustrated using the embodiment shown in FIGS. 4 and 5. With additional reference to the flowchart of FIG. 14, in Step 200, appropriately coated etalon plates A and B are provided. This includes providing large diameter (for example, 150 mm) plates A and B constructed of an appropriate material. Preferably, plates A and B are formed of fused silica, having a thickness of about ⅙th the diameter of the plates A,B. The thickness not being critical to the ultimate performance of the etalon 60. In a preferred embodiment, the surface roughness of the etalon plates A and B is less than 0.5 nanometer (nm) RMS (root-mean-squared) and smooth surface figures do not differ from a plane by more than 5 nm over spatial frequencies of 0.5 cm on one surface of each of the plates, and less than 25 nm over the same spatial frequency on the other surfaces of the plates. The plates A and B are made parallel within a preferred tolerance of less than 2 arcsecs. The fabrication of such etalon plates can be achieved using ordinary precision optical manufacturing techniques known to those having ordinary skill in the art.

An advantage of this etalon 60 construction is that the plates A, B do not require high precision manufacturing. The plates A, B may be constructed using ordinary precision optical manufacturing techniques. This greatly reduces the manufacturing costs of plates A, B. The precision of these etalons 60 is increased by carefully selecting spacers S. In order to attain the necessary degree of parallelism in such etalons 60, more than one spacer S is typically required to separate the plates A and B. One of the difficulties of such multi-spacer arrangements is that variation in spacer thickness reduces the optical fidelity of the final etalon. The principles of the present invention serve to reduce the variation in spacer thickness.

Figure 14:
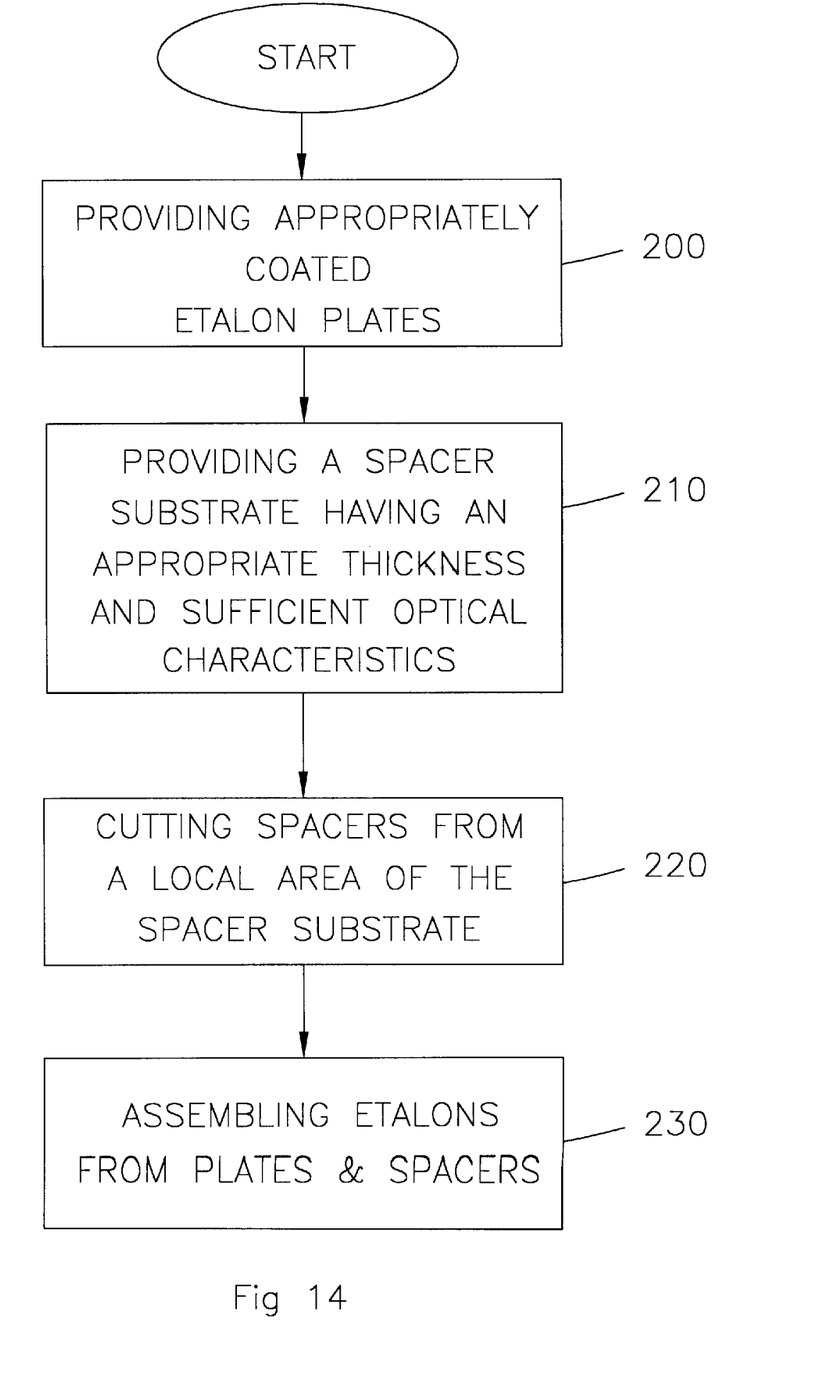
FIG. 14 is a flowchart showing a method of constructing etalons in accordance with the principles of the present invention.
Figure 15:
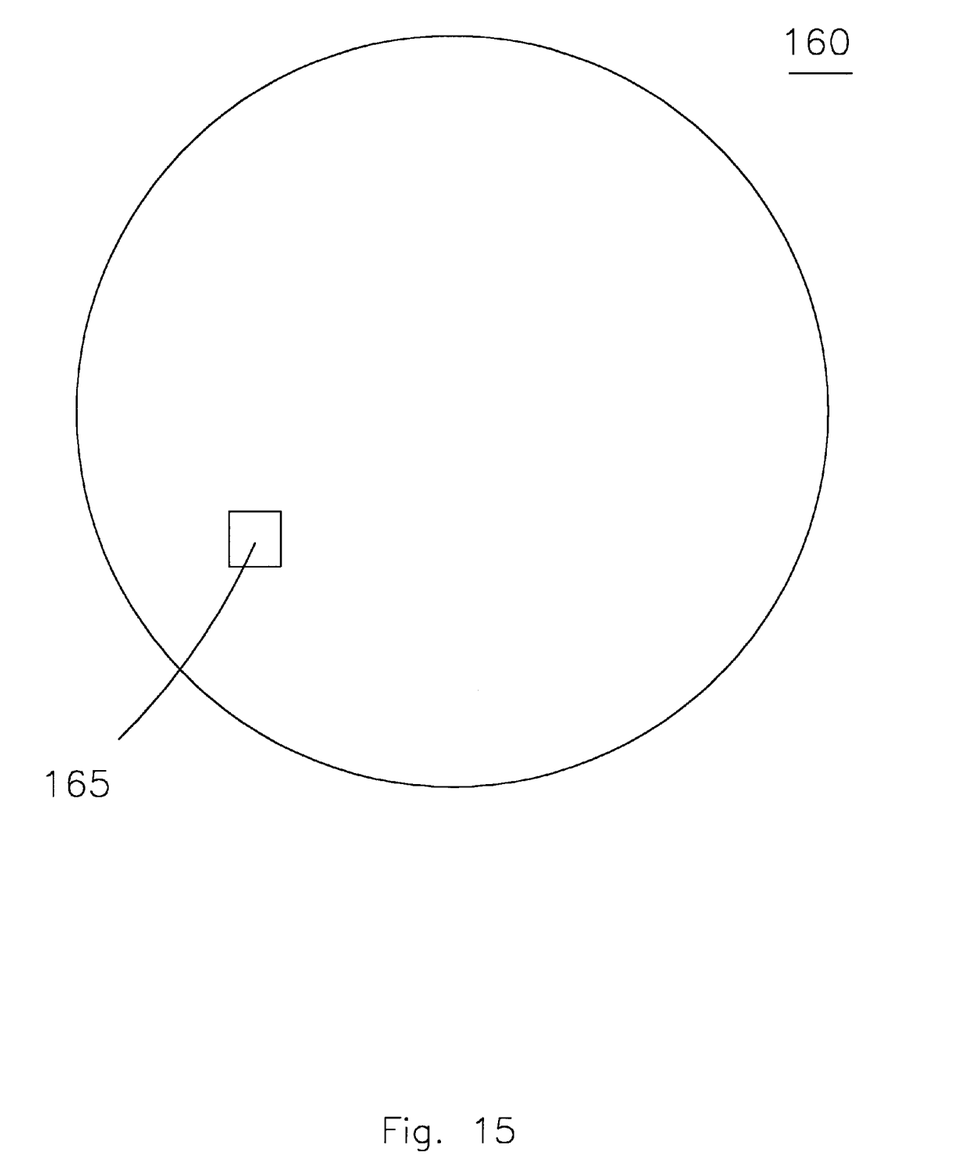
FIG. 15 is a plan view of a high precision spacer substrate with a local area shown.

With reference to FIGS. 14 and 15, in Step 210, a large spacer substrate 160 having an appropriate thickness is provided. For example, a spacer substrate 160 having a diameter of 10 inches may be used. The thickness of the spacer substrate 160 is determined by the desired optical characteristics of the filters constructed. Spacers S having high thickness uniformity and surface planarity can be made from this large spacer substrate 160. The spacer substrate 160 is typically constructed of material having low thermal expansion, for example, fused silica. The spacer substrate 160 is manufactured using ordinary precision optical manufacturing techniques known to those having skill in the art. The overall flatness of the spacer substrate 160 is preferably less than 0.5 nm RMS, having smooth surface figures which preferably do not differ from a plane by more than 5 nm over spatial frequencies of 0.5 cm on one surface of each of the plates, and less than 25 nm over the same spatial frequency on the other surfaces of the plates.

In Step 220, spacers S are cut from the substrate 160. Although the overall flatness of the spacer substrate 160 is excellent (0.5 nm RMS), any local area 165 of the substrate 160 will demonstrate even higher degrees of flatness. The same is true for substrate 160 parallelism. Therefore, by cutting the spacer substrate 160 into small pieces and choosing pieces cut from the same local area 165, spacers S having extraordinarily uniform thicknesses and flatnesses can be constructed.

In Step 230, spacers S are then assembled with plates A, B to form etalons 60 having high degrees of optical fidelity. Although shown with three spacers S, FIGS. 4 and 6 are merely illustrative and the actual number of spacers S can be greater or lesser.

Step 230 includes optically contacting the spacers S to plates A, B to form etalons 60. By optically contacting the spacers S to plates A, B, a tight molecular bond forms at the interface between the spacers S and the plates A, B. This optical contact pulls the spacers S and the plates A, B together, causing plates A and B to bend in conformity with the dimensions of the spacers S. Because the spacers S are taken from a local area 165, their flatness and parallelism are better than that of the overall flatness and parallelism of the much larger individual plates A and B. By optically contacting the spacers S to the plates A,B, the plates conform to the shape of the spacers. Since the spacers S have a greater degree of flatness and parallelism, the plates A,B in conforming to the spacers S now share these improved characteristics. This results in two plano-parallel etalon surfaces having increased flatness and parallelism. This advantage is particularly marked when a center spacer $S_1$ is used (e.g. as in FIGS. 6 and 7). By optically contacting the central spacer $S_1$ and peripheral spacers S to the plates A,B, excellent parallelism and flatness between the two plates A,B may be achieved across the entire etalon 80. As discussed previously, high quality etalons may also be created with etalons not having a central spacer by increasing the surface area covered by the spacers. Once assembled in this manner, the etalons are completed.

The present invention has been particularly shown and described with respect to certain preferred embodiments and features thereof. It is to be understood that the shown embodiments are the presently preferred embodiments of the present invention and as such are representative of the subject matter broadly contemplated by the present invention. The scope of the invention fully encompasses other embodiments which may become obvious to those skilled in the art, and are accordingly to be limited by nothing other than the appended claims, in which reference to an element in the singular is not intended to mean "one and only one" unless explicitly stated, but rather "one or more". All structural and functional equivalents of the elements of the above-described preferred embodiment that are known or later come to be known to those of ordinary skill in the art are expressly incorporated herein by reference and are intended to be encompassed by the present claims. Moreover, it is not necessary for a device or method to address each and every problem solved by the present invention, for it to be encompassed by the present claims. Furthermore, no element, component, or method step in the present disclosure is intended to be depicted to the public regardless of whether the element, component, or method step is explicitly recited in the claims. No claim element herein is to be construed under the provisions of 35 U.S.C. §112, paragraph 6, unless the element is expressly recited using the phrase "means for".

What is claimed is:

1. An air-spaced etalon filter comprising:
    a first optical element having a first optical surface which is sufficiently flat to maintain a required Finesse;
    a second optical element having a second optical surface disposed apart from said first optical surface; and
    a plurality of spacer elements having a high degree of uniform flatness, parallelism and thickness, coupled to said first and second optical surfaces for defining a gap and for maintaining said first and second optical surfaces in a high degree of uniform flatness, parallelism and distance apart throughout the gap,
    wherein said plurality of spacer elements are formed from a spacer substrate having a low coefficient of thermal expansion, such as fused silica, and a flatness of less than 0.5 nm RMS that facilitates said high degree of uniform flatness and parallelism of said first and second optical surfaces.

2. An air-spaced etalon filter as in claim 1, wherein said plurality of spacer elements are optically contacted to said first and said second optical surfaces.

3. An air-spaced etalon filter as in claim 2, wherein said first and said second optical surfaces define a central aperture and a periphery, said plurality of spacers being located at said periphery.

4. An air-spaced etalon filter as in claim 3, wherein said plurality of spacers includes a central spacer located near the center of said aperture.

5. An air-spaced etalon filter as in claim 3, wherein said etalon has a radius and each of said plurality of spacers having a length of less than half of said radius.

6. An air-spaced etalon filter as in claim 3, wherein said plurality of spacers are sized such that said spacers contact at least twenty-five percent of said first optical surface and said second optical surface.

7. An air-spaced etalon filter as in claim 3, wherein said plurality of spacers are sized such that said spacers contact about fifty percent of said first optical surface and said second optical surface.

8. An air-spaced re-entrant etalon comprising:
    a first optical element having a first optical surface which is sufficiently flat to maintain a required Finesse;
    a second optical element;
    a third optical element having a third optical surface which is sufficiently flat to maintain a required Finesse, said third optical element being optically contacted to said second optical element and separated from said first optical element such that the optical surfaces of said first and third optical elements define a gap; and
    a plurality of spacer elements having a high degree of uniform flatness, parallelism and thickness, coupled to said first and second optical surfaces for defining said gap and for maintaining said first and second optical surfaces in a high degree of uniform flatness, parallelism and distance apart throughout the gap, said second optical element being separated from said first optical element by said plurality of spacer elements,
    wherein said plurality of spacer elements are formed from a spacer substrate having a low coefficient of thermal expansion, such as fused silica, and a flatness of less than 0.5 nm RMS that facilitates said high degree of uniform flatness and parallelism of said first and second optical surfaces.

9. An air-spaced etalon filter as in claim 8, wherein said plurality of spacer elements are optically contacted to said first and said second optical surfaces.

10. An air-spaced etalon filter as in claim 9, wherein each of said plurality of spacers being formed to a high degree of uniformity such that thickness of the gap is highly uniform.

11. An air-spaced etalon filter as in claim 10, wherein said first and said second optical surfaces define a central aperture and a periphery, said plurality of spacers being located at said periphery.

12. An air-spaced etalon filter as in claim 11, wherein said plurality of spacers includes a central spacer located near the center of said aperture and where said third optical element has a central opening allowing the central spacer to pass through said central opening such that said central spacer is in optical contact with said first optical surface and said second optical surface.

13. An air-spaced etalon filter as in claim 10, wherein said plurality of spacers are sized such that said spacers contact at least twenty-five percent of said first optical surface and said second optical surface.

14. An air-spaced etalon filter as in claim 10, wherein said plurality of spacers are sized such that said spacers contact about fifty percent of said first optical surface and said second optical surface.

15. A method of mass producing etalons having high optical fidelity, said method comprising the steps of:

A. providing a first etalon plate having an aperture and a periphery;

B. providing a second etalon plate having an aperture and a periphery;

C. providing a spacer substrate having a plurality of local areas;

D. cutting a plurality of spacers from one of said local areas; and

E. optically contacting said plurality of spacers to a surface of said first etalon plate and a surface of said second etalon plate, said spacer substrate having a low coefficient of thermal expansion, such as fused silica, and a flatness of less than 0.5 nm RMS that facilitates a high degree of uniform flatness and parallelism of said surfaces of said first and second etalon plates.

16. A method as in claim 15 wherein said step of optically contacting said plurality of spacers to a surface of said first etalon plate and a surface of said second etalon plate comprises optically contacting at least one of said plurality of spacers to the aperture of said first etalon plate and the aperture of said second etalon plate.

17. A method as in claim 15 wherein said step of optically contacting said plurality of spacers to a surface of said first etalon plate and a surface of said second etalon plates comprises optically contacting said plurality of spacers to the periphery of said first and second etalon plates.

18. A method as in claim 17 wherein said first and second etalon plates each have a radius and each of said plurality of spacers having a length of less than half of said radius.

19. A method as in claim 17 wherein said plurality of spacers are sized such that said spacers contact at least twenty-five percent of said surface of the first and second etalon plates.

20. A method as in claim 17 wherein said plurality of spacers are sized such that said spacers contact about fifty percent the surface of said first etalon plate and the surface of said second etalon plate.

* * * * *